June 21, 1938. W. C. BLACK 2,121,315
VALVE WASHER
Filed May 28, 1936

Inventor
WAYNE C. BLACK
Richey & Watts
Attorneys

Patented June 21, 1938

2,121,315

UNITED STATES PATENT OFFICE 2,121,315

VALVE WASHER

Wayne C. Black, Elyria, Ohio, assignor to The Ridge Tool Company, North Ridgeville, Ohio, a corporation of Ohio Application May 28, 1936, Serial No. 82,373

4 Claims. (Cl. 251—161)

This invention relates to improvements in means for effectuating the seals in valves, and more particularly to improved valve washers.

Although heretofore various washers have been provided to correct leaky valves or faucets, there have been several difficulties which are inherent in the faucets themselves that tend to prevent overcoming the leaks, the most common defect being the pitted or roughened valve seat which has an abrasive action upon the washer, tearing the same to pieces in a very short time. Attempts to overcome this defect have resulted in the use of numerous types of reamers and replaceable valve seats, the majority of which are beyond the comprehension of the ordinary household mechanic. Still another defect present in valves is particularly found in cheap valves where the seat is not in proper axial alignment with the closure member. In a valve having this defect, no valve washer is effective for any considerable length of time and heretofore little or nothing could be done to the valve to correct the same. Some valve washers have been provided which have a more or less universal action which is accomplished by eliminating the screw for holding the valve washer onto the valve stem and substituting some form of plug or split rivet. These have their disadvantage in that dirt becomes lodged in back of the washer or the washer drops off of the stem into the valve chamber and becomes entirely ineffective. This type of valve also prevents opening of the valve to its fullest capacity, making the discharge stream of relatively small volume.

In the device of the present invention, a multi-part washer is provided but is so assembled that it is in effect a substantially integral unit and none of the parts can become lost or re-arranged in an improper manner. The washer is such that even the most inexperienced household mechanic can install the same in a faucet since it can be applied in any position and be effective.

Still other advantages reside in the economy of manufacture thereof and long life, which advantages, together with others, will become more apparent from the following description of several embodiments thereof, which together with the accompanying drawing forms a part of this specification.

Figure 2:
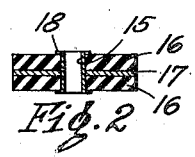
Fig. 2 is an enlarged vertical medial section of the valve washer itself.

Figs. 3 to 7 inclusive are views similar to Fig. 2 of modified forms of the invention.

Figure 1:
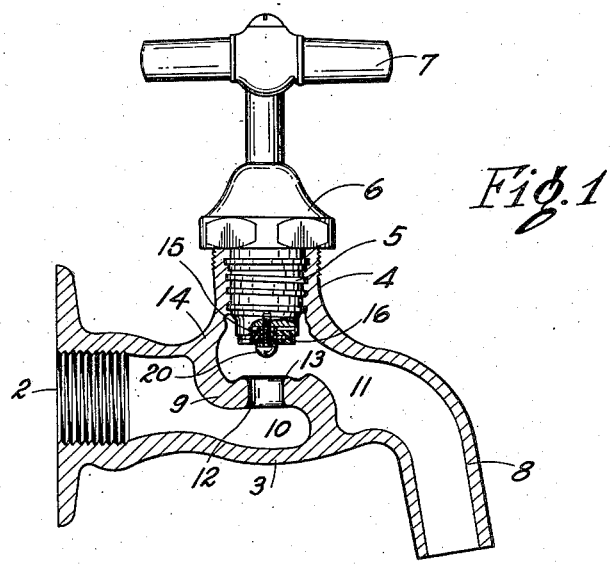
Fig. 1 is a vertical medial sectional view through a typical valve, showing the washer of my invention thereon.

Referring now to the drawing throughout which like parts have been designated by like reference characters, the faucet illustrated in Fig. 1 is not intended to limit the claims to invention, being shown merely for illustrative purposes as a typical faucet to which the valve washer may be applied, and comprises a body 1, having a coupling 2 for threaded attachment to a fluid conduit. A chamber 3 is provided in the body and the body has an upstanding portion 4 provided with threads for receiving in screw-threaded relation a valve stem 5.

A cap 6 is provided and may have a packing gland for sealing the stem which extends therethrough. An operating handle 7 is disposed on the end of the stem. A downwardly extending outlet nozzle or spout 8 is also provided. The valve chamber is divided by a diaphragm 9 into intake and out-take chambers 10 and 11 and has an orifice 12 therein surrounded by an annular seat 13. The orifice is adapted to be closed by a valve washer carried on the end of the stem 5.

Rotation of the handle 7 lowers the valve washer into contact with the seat to control fluid flow therethrough. The washer of Figs. 1 and 2 comprises a tubular sleeve 15 having a pair of resilient sealing washers 16 rotatably disposed thereon in superposed relation and separated from each other by a thin metal bearing washer 17. The ends of the sleeve extend beyond the surface of the superposed washers and may be knurled or flared over as at 18 to prevent removal of the washers from the sleeve. The flared or turned back portion of the ends, however, does not engage the surfaces of the washers so as to prevent rotation, it being desirable to maintain the washers free to rotate on the sleeve. The assembled washers, as best shown in Fig. 1, are secured to the valve stem by a screw 20 which is threaded into the stem, and the head of which engages one end of the sleeve and holds it tightly in engagement with the end of the valve stem. Thus, although the assembly is held tightly in position on the end of the valve stem, the washers are free to rotate in a manner hereinafter described. The flexibility of the washers may be sufficient so that upon closure of the valve the washer adjacent the stem is forced into close contact with the end of the stem.

In operation, when the handle 7 is turned to lower the valve washer into contact with the seat, as the lowermost washer contacts the seat, frictional engagement of the seat with the washer prevents the washer from turning further and it is lowered onto the seat without further turning action, being pushed against the seat rather than rotated frictionally into contact with the seat as in the ordinary type. This, as will be seen, prevents the abrasive action of the seat from wearing on the valve washer, no matter how rough the seat is. Each time the valve is open it is returned to the seat in a different operative position than the previous one, thus preventing any pits forming in the valve washer and causing the washer to wear evenly all around its surface.

In practice I have found that a rubber compound for the washer 16 is highly satisfactory and that a phosphor bronze shim 17 assists materially in preventing frictional engagement between the two washers 16. The sleeve 15 may be of any non-rusting material, preferably of sufficient strength to allow the screw 20 to be screwed securely home without putting pressure upon the washers. Although I have shown the ends of the sleeve as flared or rolled over to hold the washers on the sleeve, it is obvious that a plain tubular sleeve might be used, since the head of the screw 20, after the washers are once assembled on the end of the valve stem, will be sufficient to prevent the washers from dropping off of the sleeve.

Figure 3:
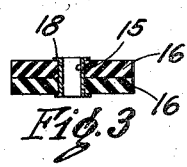

In Fig. 3 I have shown a similar washer, the operation of which is the same, but in which the anti-friction member 17 has been eliminated, the washers turning relative to each other, the adjacent faces being in contact.

Figure 4:
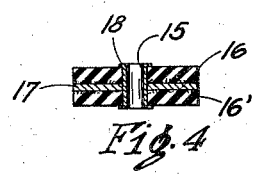

In Fig. 4 I have shown the washers 16 which have been provided during manufacture with hardened surfaces 16' for engaging the disc 17. The disc 17 in this instance may also be eliminated, allowing the hardened surfaces to provide their own anti-frictional contact, as in Fig. 3.

Figure 5:
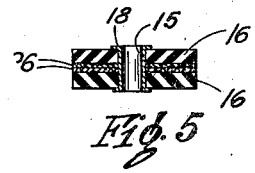

In Fig. 5 I have shown a pair of washers wherein the adjacent surfaces 26 have been provided during manufacture with an anti-friction material such as fiber or thin metal molded or vulcanized to the washer.

The operation of all of the devices shown in Figs. 2 to 5 is in substance the same. That is the lower-most washer is permitted to revolve freely in relation to the washer adjacent the stem.

Figure 6:
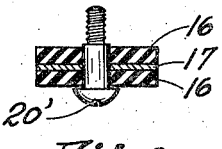

In Fig. 6 I have shown another embodiment where the sleeve is replaced by a shouldered screw 20' eliminating the necessity of a sleeve. The operation of the device is the same.

It may be advisable in some instances to use more than one shim 17 between the washers, or a shim 17 may be used between the washers of the device of Fig. 5. Other numerous combinations, all tending to produce anti-friction between the washers, will be obvious to those in view of the present invention. The lowermost or sealing faces of the washer may also be of convex form in certain instances.

Figure 7:

In Fig. 7 I have shown a washer similar to that of Fig. 6 but wherein the fiber washer 17 has been omitted and the washers are in direct contact with each other.

Having thus described my invention, I am aware that numerous and extensive departures may be made therefrom but without departing from the spirit or scope of the appended claims.

I claim:

1. In a device of the class described, a sleeve, a pair of washers rotatably carried by said sleeve in superposed relation and rotatable relative to each other, said sleeve extending beyond the sides of the washers and having the ends formed to prevent removal of the washers from the sleeve.

2. In a device of the class described, a sleeve, a pair of resilient discs rotatably disposed on said sleeve, a metal disc interposed between the resilient discs to eliminate friction between the discs, said sleeve extending beyond the sides of said discs and being flared to retain the discs on said sleeve.

3. In a valve washer, a metallic sleeve, rubber composition discs rotatably disposed on the sleeve, a metal disc disposed on the sleeve between the composition discs to eliminate friction between the composition discs, said sleeve extending beyond the sides of said washers and adapted to prevent the attaching means for attaching the washers to a valve stem from engaging the washers.

4. In a valve washer, a metallic sleeve, a pair of composition discs rotatably superposed on said sleeve, a thin metallic disc interposed between said composition discs, said sleeve extending beyond the sides of said superposed discs and having the ends flared to retain said discs on the sleeve.

WAYNE C. BLACK.